United States Patent

Griffioen et al.

[11] Patent Number: 6,129,341
[45] Date of Patent: Oct. 10, 2000

[54] DEVICE FOR INSTALLING CABLES

[75] Inventors: Willem Griffioen, Ter Aar, Netherlands; Andrzej Bogdan Wacinski, Massongex, Switzerland

[73] Assignees: Koninklijke PTT Nederland N.V., Groningen, Netherlands; Plumettaz S.A., Bex, Switzerland

[21] Appl. No.: 09/065,823

[22] Filed: Apr. 23, 1998

Related U.S. Application Data

[62] Division of application No. 08/686,184, Jul. 23, 1996, Pat. No. 5,897,103.
[60] Provisional application No. 60/001,784, Aug. 2, 1995.

[30] Foreign Application Priority Data

Jul. 24, 1995 [EP] European Pat. Off. .............. 95202037

[51] Int. Cl.[7] .................................................. G63B 35/04
[52] U.S. Cl. ........................................................ 254/134.4
[58] Field of Search ................................. 254/134.3 FT, 254/134.3 R, 134.4

[56] References Cited

U.S. PATENT DOCUMENTS

| | | |
|---|---|---|
| 4,756,510 | 7/1988 | Klamm et al. . |
| 5,143,353 | 9/1992 | Sano et al. ............................ 254/134.4 |

FOREIGN PATENT DOCUMENTS

| | | |
|---|---|---|
| 0 287 225 | 10/1988 | European Pat. Off. . |
| 0 292 037 | 11/1988 | European Pat. Off. . |
| 0 334 359 | 9/1989 | European Pat. Off. . |
| 0 384 201 | 8/1990 | European Pat. Off. . |
| 0 445 622 | 9/1991 | European Pat. Off. . |
| 0 445 858 | 9/1991 | European Pat. Off. . |
| 0 475 815 | 3/1992 | European Pat. Off. . |
| 0 606 711 A1 | 7/1994 | European Pat. Off. . |
| 2 190 457 | 11/1987 | United Kingdom . |

OTHER PUBLICATIONS

Patent Abstracts of Japan; vol. 10, No. 116; Jap. No. 60–244904; Dec. 1985; Fujikura Densen K.K.
Patent Abstracts of Japan; vol. 14, No. 76; Jap. No. JP 1292302; Nov. 1989; Sumitomo Electric Ind. Ltd.

*Primary Examiner*—Robert C. Watson
*Attorney, Agent, or Firm*—Frishauf, Holtz, Goodman, Langer & Chick, P.C.

[57] ABSTRACT

The invention pertains to a method of installing cables (2) in cable ducts (6a, 6b, 6c) using installation devices (1) propelling the cables (2) into the ducts (6a, 6b, 6c). In accordance with the invention, the installation devices (1) are powered by means of pressurized fluid (f), such as air, transported through the ducts (6a, 6b, 6c). This results in a smaller number of compressors (4) and operators being necessary. The duct in which a cable is installed and/or parallel ducts may be used for transporting the pressurized fluid (f). The feed direction of the cable (=>) may coincide with, or be opposed to, the transport direction of the fluid (–>). The invention further provides an installation device (1) for use in the method.

14 Claims, 4 Drawing Sheets

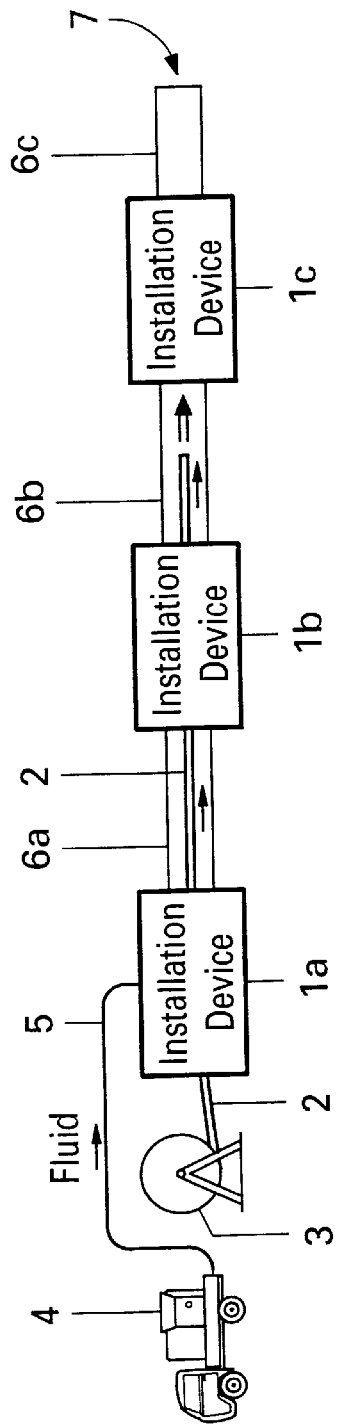
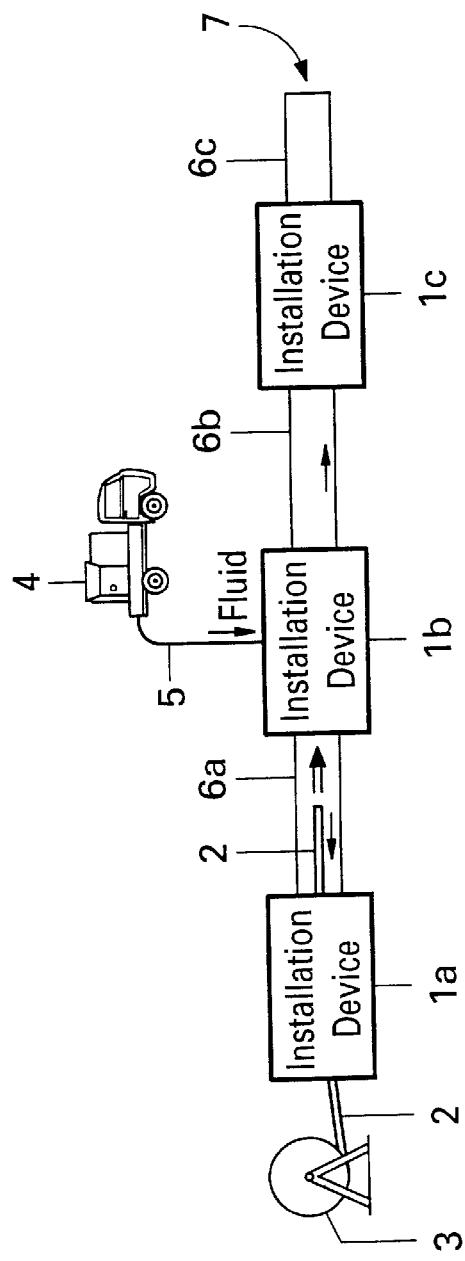

DEVICE FOR INSTALLING CABLES

Method and device for installing cables.

This is a division of application Ser. No. 08/686,184 filed Jul. 23, 1996 now U.S. Pat. No. 5,897,103 issued Apr. 27, 1999, which claims the benefit of U.S. Provisional Application No. 60/001,784 filed Aug. 2, 1995.

BACKGROUND OF THE INVENTION

The present invention relates to a method of installing cables in cable ducts by means of installation devices arranged for exerting a propelling force on the cables. In particular, the invention relates to a method of installing cables by means of installation devices which are provided with a motor and drive wheels for pushing cables into ducts. The present invention also relates to devices for installing cables using a method of this kind. A method and device of this kind are known from European Patent EP 0 292 037 (Reference [1]).

In said European Patent, a method and a device are disclosed for installing cables by means of a combination of propelling forces, a first force being exerted by motor-driven wheels and a second force being exerted by fluid drag. Said Patent also mentions the use of a plurality of such devices for installing cables over longer distances (so called "tandem use").

In prior art techniques, such as disclosed in Reference [1], each installation device is directly coupled to a source of pressurized fluid, such as a compressor. That is, as many compressors as installation devices are required. This is, however, disadvantageous for various reasons. Firstly, installation devices are often used in places where the presence of the compressor poses practical problems, e.g. in narrow streets or in small installation pits. Secondly, a number of installation devices are often required to install cables over considerable lengths, so that the same number of compressors (or other sources of pressurized liquid) are required to install the cable, thus substantially increasing the cost of the method. As each compressor usually requires an operator, labor cost may also be substantial when installing cables over longer distances. Thirdly, moving a compressor to a new location when e.g. an extra compressor is required, is cumbersome, as compressors are generally heavy and difficult to relocate.

For example, the method of Reference [1] may require four installation devices and thus four compressors to install a cable over the length of 2 km.

Other prior art techniques, such as disclosed in e.g. References [5] and [6], do not solve these problems. Reference [5] teaches to relocate the compressor to inject air at another air inlet of the duct as the cable installation proceeds. Similarly, Reference [6] discloses a method in which compressed air is fed into a duct at successive feed ports. This also requires a displacement of the compressor or the use of a plurality of compressors. Moreover, these References do not deal with cable installation using two or more installation devices capable of mechanically exerting a pushing force on the cable, e.g. by means of drive wheels.

SUMMARY OF THE INVENTION

An object of the present invention is to provide a method and device for installing cables which alleviate the above-mentioned and other problems of the prior art and which enable the efficient installation of cables at low cost. Another object of the present invention is to provide a method and device for installing cables which enable the efficient and versatile installation of cables even at locations where a compressor or other source of pressurized liquid (e.g. a gas flask) cannot be used.

Accordingly, a method of installing a cable in a cable duct by means of an installation device comprising mechanical means for exerting a propelling force on the cable in accordance with the present invention comprises the steps of: placing the installation device at one end of the duct, passing fluid through the duct from a fluid inlet spaced apart from the installation device, energizing the installation device by fluid passed through the duct, and passing at least one cable through the duct by means of the installation device.

The present invention is based on the insight that a cable propulsion means, such as a pneumatic or hydraulic motor, can be remotely powered. The present invention is based on the further insight that ducts can not only be used for accomodating cables, but also for transporting pressurized fluids (such as gases and liquids). It is of course possible to use separate, portable tubes or hoses which are installed along with the compressors to power these. Although this offers a feasible solution, the laying and subsequent removal of separate powering tubes constitutes an additional installation step which increases cost. It is, therefore, less expensive and more practical to utilize tubes which are already in place when the actual cable installation begins.

The invention is based on the further insight that the problem of powering installation devices in remote, distinct places exists and requires an efficient, inexpensive solution. By passing fluid through a duct in order to energize the installation devices, it becomes possible to remotely energize the installation devices. It also becomes possible to energize a plurality of installation devices by a single, shared fluid source.

The fluid inlet for feeding fluid into the duct may be arranged in another installation device. That is, another installation device may be used to feed the fluid into the duct. Alternatively, the fluid inlet may arranged in the duct. In the latter case, a fluid inlet may be made in a duct section.

The fluid and a cable may be passed through separate ducts or duct sections. Thus, a duct parallel to the duct (section) in which the cable is installed may be used for transporting the energizing fluid. This may offer the advantage of enabling a greater amount of fluid to be transported. However, the fluid and a cable may also be passed through the same duct or duct section, e.g. in the case only a single duct is present.

Installation devices are preferably placed between duct sections and at the beginning of the duct. Depending on the length of the duct sections, it may be possible to feed a cable through two or more duct sections using a single installation device.

The fluid used is preferably compressed air. However, other gases (such as nitrogen) or liquids (water, oil) may also be used.

With the method of the present invention, it is also possible to install at least two cables simultaneously by feeding the group of cables through an installation device simultaneously, or by placing two installation devices in parallel. In this text, the term "cable" or "cables" will be used to refer to a group of cables, said group consisting of one or more copper cables, fiber optic cables, reinforced optical fiber bundles, and the like.

In order to further the advancement of the cable in case the cable feed direction coincides with the fluid transport direction, the cable may be provided with a "shuttle" or pulling plug. Such a shuttle, as e.g. disclosed in Reference [4], provides an additional pulling force. It will be understood that both semi-open shuttles (as in Reference [4]) and closed shuttles may be used.

A device for installing cables in accordance with the invention preferably comprises a receiving part for receiving a cable, a drive part provided with mechanical means for exerting a propelling force on the cable, and an insertion part for inserting a cable in a duct, said mechanical means being arranged for being energized by means of pressurized fluid fed through the device.

REFERENCES

[1] EP 0 292 037 & U.S. Pat. No. 4 850 569 & U.S. Pat. No. 4 934 662
[2] EP 0 445 622 & U.S. Pat. No. 5 143 353
[3] JP 60-244 904
[4] EP 0 445 858
[5] EP 0 475 815
[6] JP 01-292 302

These references are herewith incorporated in this text.

BRIEF DESCRIPTION OF THE DRAWINGS

FIG. 1 shows schematically a first arrangement in which the method of the invention is deployed.

FIG. 2 shows schematically a second arrangement in which the method of the invention is deployed.

DESCRIPTION OF PREFERRED EMBODIMENTS

Figure 3:
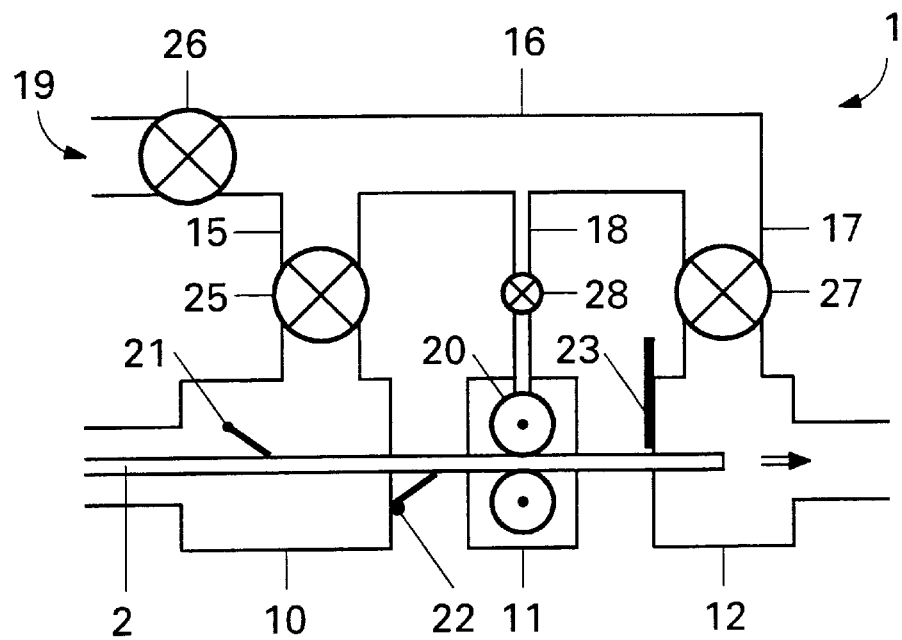
FIG. 3 shows schematically a first embodiment of an installation device according to the invention, having a separate drive part.

The system depicted schematically and by way of example in FIG. 1 comprises installation devices 1a, 1b and 1c, a cable 2, a cable reel 3, a compressor 4, and a pressure tube 5. The system is used to install the cable 2 in a duct consisting of duct sections 6a, 6b and 6c.

As shown in FIG. 1, the cable 2 is installed by means of installation devices 1a, 1b and 1c placed at the beginning of the duct sections 6a, 6b and 6c respectively. The first installation device 1a may be a device as disclosed in Reference [1]. The second installation device 1b and the third installation device 1c will later be discussed in more detail with reference to FIGS. 3–6.

The cable 2 is taken off the cable reel 3 and fed into the first installation device 1a. The cable feed direction (to the right in FIG. 1) is indicated by a double arrow (=>), while the fluid (i.c. air) feed direction is indicated by a single arrow (–>). The first installation device 1a is energized by fluid fed from the compressor 4 to the first installation device 1a by means of the tube 5. The first installation device 1a is thus directly energized by the compressor 4 via the tube 5.

It should be noted that the pressurized fluid preferably is pressurized air although other gases and even liquids, such as water, may also be employed. The compressor may be replaced by suitable other energizing means, such as a pressurized container, a water pump, and the like.

The first installation device 1a is placed at one end, i.e. the cable feeding end, of the first duct section 6a. Preferably the installation device 1a will be placed directly next to the duct section 6a and will be connected to the duct section 6a in a fluid-tight fashion in order to prevent the leakage of fluid. Alternatively, if the installation deviced is spaced apart from the duct section, a suitable seal should be provided to substantially close off the duct section, apart from openings for inserting the cable and feeding fluid.

From the first installation device 1a, both the cable 2 and the pressurized fluid are fed to the second and third installation devices 1b and 1c through the duct sections 6a and 6b. It will be understood that the duct sections 6a, 6b and 6c are shown in FIG. 1 considerably shortened for the sake of clarity of the illustration.

As shown in FIG. 1, the fluid feed direction (–>) coincides with the cable feed direction (=>). In this instance, the fluid flow may exert an auxiliary propulsion force (fluid drag) if the fluid speed is high relative to the cable speed. This will especially be the case when the last duct section (i.e. section 6c in FIG. 1) has an open exhaust, i.e. when the end 7 of the duct section 6c is open to the atmosphere. However, in some instances it may be necessary to partially or totally close off the exhaust 7 of duct section 6c in order to preserve sufficient pressure for powering the installation devices 1b and 1c.

The system depicted schematically in FIG. 2 also comprises installation devices 1a, 1b and 1c, a cable 2, a cable reel 3, a compressor 4, and a pressure tube 5. The system is used to install the cable 2 in a duct also consisting of duct sections 6a, 6b and 6c. As in the system of FIG. 1, the cable 2 is taken off the reel 3 and fed into the first installation device 1a. Contrary to the system of FIG. 1, pressurized fluid is fed from the compressor 4 via the tube 5 to the second (middle) installation device 1b. From the second installation device 1b, fluid is fed through the duct section 6a to the left, in the cable upstream direction, towards the first (leftmost) installation device 1a. Fluid is also fed through the duct section 6b to the right, in the cable downstream direction, towards the third (rightmost) installation device 1c. In the configuration of FIG. 2, fluid flows in one duct section (i.e. duct section 6a) contrary to the cable feed direction and in another duct section (i.e. duct section 6c) in the cable feed direction. This is indicated by arrows (<– and –>) in FIG. 2. As the fluid speed will be held low, the fluid drag caused by the fluid flowing contrary to the cable feed direction is negligible. The fluid speed in duct section 6a can be held low by closing off the exhaust of the installation device 1a at least partially.

As stated above, in accordance with the invention the ducts or duct sections (6a, 6b, 6c) are used as means for transporting energy for powering installation devices (1a, 1b, 1c). Preferably, said energy is contained in pressurized fluids such as air, gas in general, water, or other liquids, such as oil. As stated before, the said compressor may be replaced by e.g. a pressurized gas container or a hydraulic pump. In the remainder of this text, the term "air" will be used to describe specific examples, but the use of other fluids, both liquids and gases, will explicitly not be excluded.

The method of the present invention may also be employed in the case of a single installation device. In that case, an installation device may be placed at the upstream end of a duct, with respect to the cable feed direction, while the compressor may be placed at the downstream end (which should be suitably closed off to prevent a fluid leak while allowing the cable to pass). The fluid and the cable move accordingly in opposite directions, if they travel through the same duct. This configuration still results in the remote powering of the installation device via a duct.

The installation device 1 shown diagrammatically and by way of example in FIG. 3 comprises a receiving part 10 for receiving a cable from e.g. a duct section, a drive part 11 for exerting a drive force on a cable 2, and an insertion part 12 for inserting the cable 2 into a duct section. The said parts are connected via tubes 15, 16, 17 and 18, which preferably comprise valves 25, 26, 27 and 28 respectively. The tube 16 has an open exhaust 19, which can preferably be closed off by the valve 26. When in use, air passes from the receiving part 10 through the tubes 15, 16 and 17 to the insertion part 12. Alternatively, if the air flow is contrary to the cable feed direction, air passes in the opposite direction.

The drive part 11 comprises a pneumatic motor which is energized (powered) by means of pressurized air via the tubelet 18. The drive wheels 20, which are powered by the motor and which propel the cable 2, may be pressed onto the cable 2 pneumatically or by means of springs (not shown in FIG. 3). The drive wheels 20 may be replaced by drive tracks (caterpillars) if a better contact with the cable 2 is required. As the drive part 11 is separate from the receiving part 10 and the insertion part 12, the drive part need not be pressurized.

If the cable feed direction (indicated by=>) coincides with the air feed direction, pressurized air may be passed to the next installation device via the duct section (not shown) opposite the insertion part 12. In that case, the receiving part 10 can receive pressurized air from the preceding duct section. It is also possible that flow of pressurized air is reversed. In that case the insertion part 12 receives air from a duct section, while the receiving part 10 passes the air to the next duct section.

The valves 25, 26, 27 and 28 serve to lead the flow of air in the desired directions. These valves can be operated manually or automatically, preferably pneumatically. In the latter case a pneumatic switch 21, operated by the passing cable 2, may be used for control purposes. The valves 22 and 23 (shown as a pivoting and a sliding valve respectively) serve to maintain air pressure when the tubes and the installation device are pressurized before the cable is passed through. Valve 22 may also be constituted as a "passive" valve, i.e. operated by the cable 2, closing off the receiving part 10 when blowing off air into the atmosphere. In that case the function of switch 21 may be integrated into valve 22.

In principle the device 1 may be operated without the valves and switches mentioned. The connections of the tubes are in that case made manually when necessary.

The parts 10, 11 and 12 may be longitudinally divisible so as to allow the device 1 to be opened up and to be placed around a cable 2. In this way, the device 1 may be used for further installing an already partially installed cable.

Figure 4:
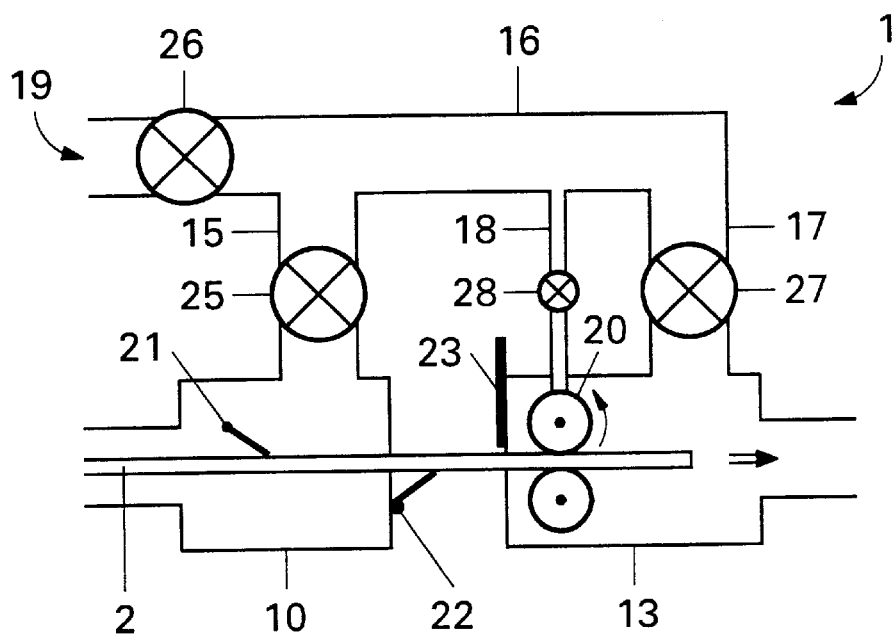
FIG. 4 shows schematically a second embodiment of an installation device according to the invention, having an integrated drive part.

FIG. 4 shows diagrammatically and by way of example another embodiment of an installation device according to the present invention. The embodiment of FIG. 4 is largely identical to the embodiment of FIG. 3. However, in the installation device 1 of FIG. 4, the drive part 11 and the insertion part 12 are integrated into a single part 13. This has the advantage that the cable is pulled rather than pushed into the pressurized insertion part. On the other hand, a separate drive part normally allows more space for e.g. a caterpillar instead of drive wheels 20. Also, a separate drive part need not be pressurized and thus allows an easy access to the drive wheels 20 or their equivalents.

Figure 5:
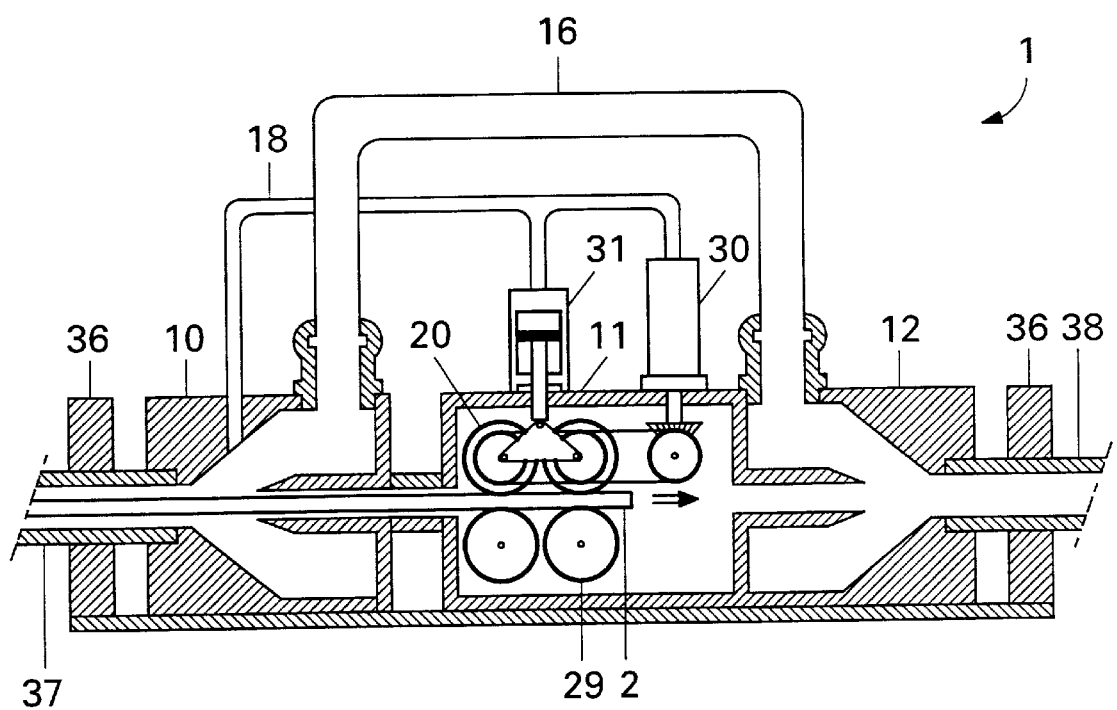
FIG. 5 shows a cross section of a third embodiment of an installation device according to the present invention, comprising a bypass for feeding fluid from one duct section to the next.

FIG. 5 shows a cross-sectional view of a practical embodiment of an installation device 1 of the present invention. This embodiment is an adaptation of the device disclosed in EP 0 292 037 & U.S. Pat. No. 4 850 569. The device of FIG. 5 comprises a receiving part 10, a drive part 11 and an insertion part 12, connected by an integrated tube 16 (corresponding with the tubes 15, 16 and 17 of FIG. 3). The drive part 11 contains a pneumatic motor 30 for propelling the cable 2 by means of drive wheels 20. The drive part 11 further contains a pressure cylinder 31 for pressing the drive wheels 20 against the cable 2. In the embodiment shown, support wheels 29 are not driven.

A tube 18 pneumatically connects the pneumatic motor 30 and the pressure cylinder 31 with the receiving part 10, thus allowing pressurized air from the receiving part 10 to power the motor 30 and the cylinder 31.

The tube 16, which pneumatically connects the receiving part 10 and the insertion part 12, allows air to flow via these parts to a subsequent duct section. Thus, in the device 1 of FIG. 5 air bypasses the drive part 11 via the tube 16 and is fed to the next duct section (not shown). The tube 16, as well as the tube 18, may optionally be provided with suitable valves to regulate the air flow.

In a field trial the device of FIG. 5 was used to install a cable having a diameter of 13 mm in a duct having a length of 1000 m and an inner diameter of 27 mm. At the beginning of the duct, a device as disclosed in Reference [1] was used, while the device of FIG. 5 was placed at 650 m from the beginning of the duct. The cable was installed succesfully, although the pressure at the beginning of the duct was only 4.5 bar. A shuttle was not used in this trial.

Figure 6:
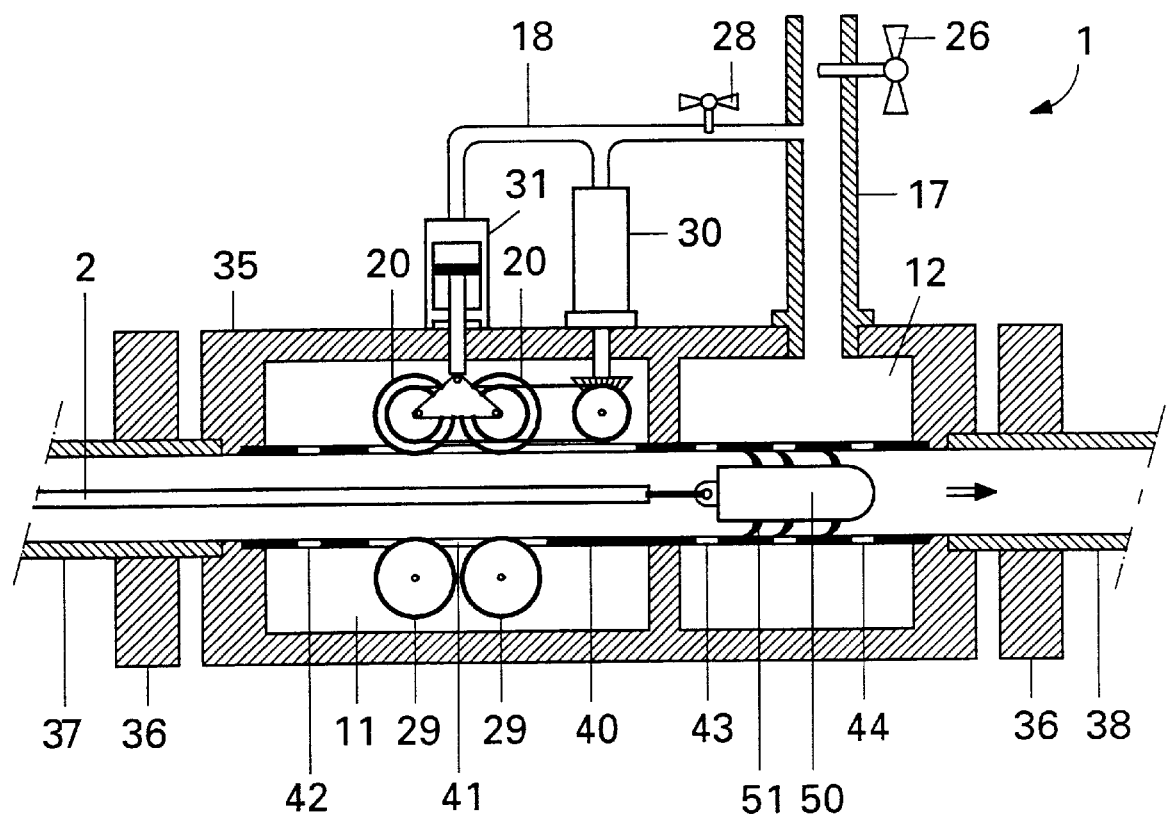
FIG. 6 shows a cross section of a fourth embodiment of an installation device according to the present invention, especially suitable for use with a shuttle.

FIG. 6 shows a cross-sectional view of another practical embodiment of an installation device 1 of the present invention. In the embodiment of FIG. 6, which is specifically suitable for cable installation with a so-called shuttle (pulling plug), air does not bypass the drive part 11 but is fed directly through the device.

The installation device 1 of FIG. 6 is to a large extent similar to the device 1 of FIG. 5. Similar parts have therefore been denoted with corresponding reference numerals. However, the embodiment of FIG. 6 does not have a separate receiving part. The receiving/drive part 11 and the insertion part 12 are integrated into one housing 35.

The housing 35 may be longitudinally divisible into two sections in order to allow the device 1 to be placed "around" a cable. As in the embodiment of FIG. 5, the receiving and insertion tubes 37 and 38 respectively are fixed by means of clamps 36, so as to immobilize the tubes relative to the housing 35 when under pressure.

Centrally located in the housing 35 is a cylindrical channel, constituted by the (partially perforated) guide tube 40, through which both the cable 2 and the pressurized air may be passed. The guide tube 40 is provided with opposite openings 41 which allow the drive wheels 20 and the support wheels 29 to reach the cable 2. In the drive part 11 the guide tube 40 is further provided with perforations 42, while in the insertion part 12 the tube 40 is provided with perforations 43 and 44. These perforations 42, 43 and 44 serve to pass air from the tube 40 to the drive part 11 and the insertion part 12 respectively, as will further be explained below.

The cable 2 shown in FIG. 6 is provided with a shuttle 50 having flaps 51. A shuttle effectively closes off the tube 40, although a semi-open shuttle may be used which causes a smaller pressure gradient. In operation, the shuttle 50 passes the openings 41 in the guide tube 40 before the cable does (note that the cable feed direction is again indicated by a double arrow:=>). As this happens, the drive part 11 will quickly fill with pressurized air. In order to prevent distortion of the flaps 51 of the shuttle 50 due to the pressure gradients, the tube 40 preferably has perforations 42 to the left of the said openings 41.

As the shuttle 50 has passed the perforations 43 of the tube 40, gradually more air will flow into the insertion part 12. This air will initially flow away through the perforations 44 and leave the installation device 1 via the tube 38. Only when the shuttle 50 reaches the last perforations 44 maximum pressure will build in the chamber 12. This pressure can be used to energize the pneumatic motor 30 and the pressure cylinder 31 via the tube 17, the valve 28 and the tube 18. The perforations 43 and 44 in the tube 40 should therefore be large enough to allow a sufficient flow of air towards the motor 30 and cylinder 31. On the other hand the perforations 43 and 44 should be small enough to maintain enough pressure to propel the shuttle. By means of said perforations a gradual energizing of the installation device is achieved.

Instead of the said perforations, a single hole or slit (not shown in FIG. 6) may be provided in order to allow air to pass into the chamber of the insertion part 12. It should be noted that in practice the shuttle may be longer than the section of the tube 40 provided with perforations 43 and 44. In that case it is not possible for air to leak "around" the shuttle, i.e. from within the tube 40 through the perforations 43 and 44 to the tube 38. A longer shuttle may be used to effectively reduce or even prevent this leakage. In order to ensure that a longer shuttle is capable to negotiate bends in the ducts, such a shuttle may consist of two parts, spaced apart by a cord or a flexible rod, or may have a flexible elongated body.

The valve 28 can be used to turn the motor 30 off. The cylinder 31 presses the drive wheels 20, which preferably are provided with grooves in order to enhance friction, downwards onto the cable 2. The opposite support wheels 29 may be passive, i.e. may not driven, and may remain in position, i.e. may not be provided with a press cylinder. The pressure release valve 26 may be used to release excess pressure.

It should be noted that in the device of FIG. 5, the air necessary to power the motor 30 is taken from the receiving part 10, while in the device of FIG. 6, the motor 30 is powered by air taken from the insertion part 12.

In summary, the invention provides a method of installing cables in (preferably previously installed) cable ducts using installation devices propelling the cables into the ducts. The propelling force is preferably exerted by driven wheels or the like, but may also be exerted by fluid drag. The installation devices are powered by means of pressurized fluid, such as air, transported through the ducts. The duct in which a cable is installed and/or one or more parallel ducts may be used for transporting the pressurized fluid. The feed direction of the cable may coincide with, or be opposed to, the transport direction of the fluid.

It will be understood by those skilled in the art that the embodiments described in the above are given by way of example only and that numerous additions and modifications may be made without departing from the spirit and scope of the present invention. The method and devices described in the above may e.g. also be used to remove cables from ducts.

What is claimed is:

1. A device for installing cables, comprising:

a receiving part which receives a cable that is connectable to an end of a first duct section;

a fluid powered drive part which mechanically exerts a propelling force on the received cable;

an insertion part which is connectable to an end of a second duct section for inserting the received cable in said second duct section; and passages for feeding pressurized fluid from one of said first and second duct sections to the other one of said first and second duct sections and to the drive part so as to energize the drive part.

2. The device according to claim 1, wherein the drive part is integrally formed with the receiving part.

3. The device according to claim 1, wherein the drive part is integrally formed with the insertion part.

4. The device according to claim 1, further comprising a guide tube for guiding the cable through the device.

5. The device according to claim 4, wherein the guide tube is provided with perforations for gradually pressurizing the device.

6. The device according to claim 1, further comprising a bypass for feeding pressurized fluid from the receiving part to the insertion part.

7. The device according to claim 1, further comprising a bypass for feeding pressurized fluid from the insertion part to the receiving part.

8. The device according to claim 1, wherein the fluid powered drive part comprises wheels.

9. The device according to claim 1, wherein the fluid powered drive part comprises a caterpillar.

10. The device according to claim 9, wherein the fluid powered drive part comprises a mechanical member that is pneumatically pressed against the cable.

11. The device according to claim 1, wherein the fluid powered drive part comprises a pneumatic motor.

12. The device according to claim 1, further comprising an open exhaust for bleeding excess fluid.

13. The device according to claim 1, wherein the passages comprise tubes.

14. The device according to claim 13, further comprising valves for closing off and opening respective ones of the tubes so as to control operation of the device.

* * * * *